United States Patent
Nakano et al.

(10) Patent No.: US 8,255,898 B2
(45) Date of Patent: *Aug. 28, 2012

(54) SYSTEM SOFTWARE UPDATE METHOD

(75) Inventors: Takahiro Nakano, Yokohama (JP); Masakuni Agetsuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,942

(22) Filed: Aug. 2, 2011

(65) Prior Publication Data

US 2011/0289494 A1  Nov. 24, 2011

Related U.S. Application Data

(63) Continuation of application No. 11/622,253, filed on Jan. 11, 2007, now Pat. No. 8,015,559.

(30) Foreign Application Priority Data

Nov. 15, 2006  (JP) .................................. 2006-308895

(51) Int. Cl.
G06F 9/44 (2006.01)
G06F 9/445 (2006.01)
G06F 15/177 (2006.01)
G06F 9/00 (2006.01)

(52) U.S. Cl. ............. 717/171; 717/176; 709/221; 713/1

(58) Field of Classification Search .................. None
See application file for complete search history.

(56) References Cited

U.S. PATENT DOCUMENTS

| | | |
|---|---|---|
| 5,701,492 A | 12/1997 | Wadsworth et al. |
| 6,317,844 B1 | 11/2001 | Kleiman |
| 7,062,676 B2 | 6/2006 | Shinohara et al. |
| 7,080,134 B2 * | 7/2006 | Doherty et al. ............... 709/221 |
| 7,249,174 B2 * | 7/2007 | Srinivasa et al. ............... 717/171 |
| 7,251,813 B2 * | 7/2007 | Kosuge ......................... 717/171 |
| 7,356,677 B1 * | 4/2008 | Rafizadeh ......................... 713/1 |
| 7,380,113 B2 * | 5/2008 | Ebsen et al. ................... 713/100 |
| 7,644,262 B1 * | 1/2010 | Bromley et al. .................. 713/1 |

(Continued)

FOREIGN PATENT DOCUMENTS

| | | |
|---|---|---|
| JP | 2004-227127 | 8/2004 |
| JP | 2005-148922 | 6/2005 |
| JP | 2005-267327 | 9/2005 |

OTHER PUBLICATIONS

NSI and Double-Take, Networking and Double-Take Failover, May 2002, [online], retrieved on Apr. 27, 2012, pp. 1-15. Retrieved from the Internet: <URL: http://www.lagoas.com/Produtos/Double-Take/Docs/Networking%20and%20Double-Take%20Failover.pdf>.*

(Continued)

*Primary Examiner* — Thuy Dao
*Assistant Examiner* — Hanh T Bui
(74) *Attorney, Agent, or Firm* — Brundidge & Stanger, P.C.

(57) ABSTRACT

Provided is a computer system including a first server and a storage system. In the first server, a first virtual server and a second virtual server are operated. Upon reception of a request to boot the first virtual server, the second virtual server judges whether system software of the first virtual server, which is requested to be booted, matches system software of the first server in which the first virtual server is operated. In the case where the system software of the first virtual server and the system software of the first server do not match, the second virtual server updates the system software of the first virtual server before booting the first virtual server.

8 Claims, 10 Drawing Sheets

U.S. PATENT DOCUMENTS

| | | | |
|---|---|---|---|
| 7,685,461 | B2 | 3/2010 | Brundidge et al. |
| 7,810,088 | B2 | 10/2010 | Herle et al. |
| 2002/0092010 | A1 | 7/2002 | Fiske |
| 2003/0032425 | A1 | 2/2003 | Kim et al. |
| 2003/0084132 | A1* | 5/2003 | Ohta ............................ 709/221 |
| 2003/0154275 | A1* | 8/2003 | Daase et al. .................. 717/171 |
| 2003/0233431 | A1* | 12/2003 | Reddy et al. .................. 709/223 |
| 2004/0143608 | A1 | 7/2004 | Nakano et al. |
| 2004/0261073 | A1 | 12/2004 | Herle et al. |
| 2005/0102562 | A1 | 5/2005 | Shinohara et al. |
| 2005/0210067 | A1 | 9/2005 | Nakatani et al. |
| 2006/0184653 | A1 | 8/2006 | van Riel |
| 2008/0040483 | A1 | 2/2008 | Nakatani et al. |
| 2010/0100611 | A1* | 4/2010 | Hatasaki et al. ............. 709/221 |
| 2011/0055824 | A1* | 3/2011 | Benari ......................... 717/176 |
| 2011/0061046 | A1* | 3/2011 | Phillips ........................ 717/176 |

OTHER PUBLICATIONS

Masato Hori et al., Scalability Issues of Dynamic Space Management for Multiple-Server Networked Vitural Environments, 2001, [online], retrieved on Apr. 27, 2012, pp. 1-4. Retrieved from the Internet: <URL: http://ieeexplore.ieee.org/stamp/stamp.jsp?tp=&arnumber=953557>.*

Beverly Schwartz et al., Smart Packets: Applying Active Networks to Network Management, Feb. 2000, [online], retrieved on Apr. 27, 2012, pp. 67-88. Retrieved from the Internet: <URL: http://delivery.acm.org/10.1145/340000/332893/p67-schwartz.pdf?>.*

NSI and Double-Take, Domain Controller Failover When Using Active Directory [online], 2002 [retrieved on Apr. 29, 2011], pp. 1-10. Retrieved from the Internet: <URL:http://www.lagoas.com/Produtos/Double-Take/Docs/Domaiff/020Controller'/020Failover°/020when°/020using%20Active/020Directory.pdf>.

Aaron Tiensivu's Blog, Increased functionality and virtual machine control in the Windows Server 200 Failover Cluster Management console for the Hyper-V role [online], 2008 [retrieved on Apr. 29, 2011], pp. 1-3. Retrieved from the Internet<URL: http://blog.tiensivu.com/aaron/archives/1684-KB-951308-Increased-functionality-and-virtual-machine-control>.

* cited by examiner

| | 200 | | |
|---|---|---|---|
| 201 — VNAS NAME | VNAS 1 | VNAS 2 | VNAS3 |
| 202 — NETWORK DEVICE | NETWORK IF 105A | NETWORK IF 105B | NETWORK IF 105C |
| 203 — BLOCK DEVICE | LU1, LU2 | LU3, LU4 | LU5, LU6 |
| 204 — ROOT FILESYSTEM | LU1 | LU3 | LU5 |
| 205 — SYSTEM SOFTWARE VERSION | 1.0 | 1.0 | 1.0 |

*FIG. 2*

SYSTEM SOFTWARE UPDATE METHOD

CLAIM OF PRIORITY

The present application is a continuation application of U.S. application Ser. No. 11/622,253, filed Jan. 11, 2007, now U.S. Pat. No. 8,015,559, which claims priority from Japanese patent application P2006-308895 filed on Nov. 15, 2006 and, the contents of which are hereby incorporated by reference into this application.

BACKGROUND

This invention relates to a computer system in which a cluster is constituted by multiple nodes in each of which a virtual server is operated, and more particularly, to a technique of upgrading system software.

JP 2005-148922 A discloses a technique of upgrading system software of a node. According to this technique, it is possible to suppress the downtime of a service provided to a client computer (client PC) as much as possible. Specifically, after the service provided to the client PC is failed-over to a standby node, the system software of the node is upgraded. With this operation, the client PC can use the service even while the system software of the node is being upgraded.

JP 2004-227127 A discloses a computer system in which multiple virtual servers are operated in a node. In this computer system, each virtual server provides a service. Computer systems of this type include a computer system in which a virtual server is operated for each application program group. In this computer system, a root filesystem of the virtual server is changed according to a change of environment. With this operation, different settings can be implemented in individual virtual servers. The root filesystem includes system software and setting information which is necessary to operate the system software.

JP 2005-267327 A discloses a technique of improving the reliability of a computer system in which multiple virtual servers are operated in a node. In this computer system, a filesystem of each virtual server is shared by multiple nodes which constitute a cluster. The virtual server is operated in one of the multiple nodes which constitute a cluster. During failover, a virtual server operated in the failover source is shut down. The virtual server which has been shut down is booted in a failover-destination node. With this operation, the multiple nodes which constitute a cluster can continuously provide services to the client PC.

SUMMARY

The system software of the computer system disclosed in JP 2005-267327 A includes node system software and VNAS system software. The node system software is executed by the nodes which constitute a cluster. The VNAS system software is executed by the virtual servers operated in the nodes.

The node system software can be upgraded by the technique disclosed in JP 2005-148922 A.

On the other hand, the virtual server executes the VNAS system software in the node that executes the node system software. Accordingly, when a version of the node system software differs from a version of the VNAS system software, the compatibility of the two pieces of system software may not be maintained. In this case, an inconvenience may be caused in that an error occurs when the virtual server is operated or a wrong result is returned.

Thus, when the node system software of a failover-destination node is upgraded, the virtual server cannot be failed over to the failover-destination node. This is because the VNAS system software of the virtual server that is operated in the failover-source node is of an old version.

In order to upgrade the VNAS system software of the virtual server, it is necessary to shut down the service provided by the virtual server. After the service of the virtual server is shut down, the VNAS system software of the virtual server is upgraded. Then, the virtual server is failed over to a failover-destination node.

As described above, it is necessary to shut down the service provided to the client PC for a long time to upgrade the VNAS system software of the virtual server.

When the virtual servers are respectively handled by different administrators, an operator who upgrades the system software of the virtual server needs to ask each of the administrators to shut down and restart the service of the virtual server. Thus, a large burden is imposed on the operator, who upgrades the system software of the virtual server.

This invention has been made to solve the above-mentioned problems, and it is therefore an object of this invention to provide a computer system for reducing the downtime of a service provided by a virtual server.

According to an exemplary embodiment of this invention, there is provided a computer system, comprising: a first server which has a first processor, a first memory, and a first interface; and a storage system which is coupled to the first server and has a storage unit for storing data and an input/output control unit for controlling input/output of data to/from the storage unit, wherein each of the first processor, the first memory, and the first interface is logically divided, wherein the divided first processor, the divided first memory, and the divided first interface are operated in the first server as an independent virtual servers, wherein the virtual servers includes at least one first virtual server for providing a service and a second virtual server for managing the first virtual server, wherein, upon reception of a request to boot the first virtual server, the second virtual server judges whether system software of the first virtual server which is requested to be booted matches system software of the first server in which the first virtual server is operated, and wherein, in the case where the system software of the first virtual server and the system software of the first server do not match, the second virtual server updates the system software of the first virtual server before booting the first virtual server.

According to the representative mode of this invention, it is possible to reduce the downtime of a service provided by the virtual server. Further, burden imposed on an operator who upgrades the system software of the virtual server can be reduced.

BRIEF DESCRIPTION OF THE DRAWINGS

The present invention can be appreciated by the description which follows in conjunction with the following figures, wherein:

FIG. 2 is a configuration diagram of a VNAS configuration table stored in the system LU for the node according to the embodiment of this invention;

DETAILED DESCRIPTION OF THE PREFERRED EMBODIMENT

Hereinafter, an embodiment of this invention will be described with reference to the accompanying drawings.

Figure 1:
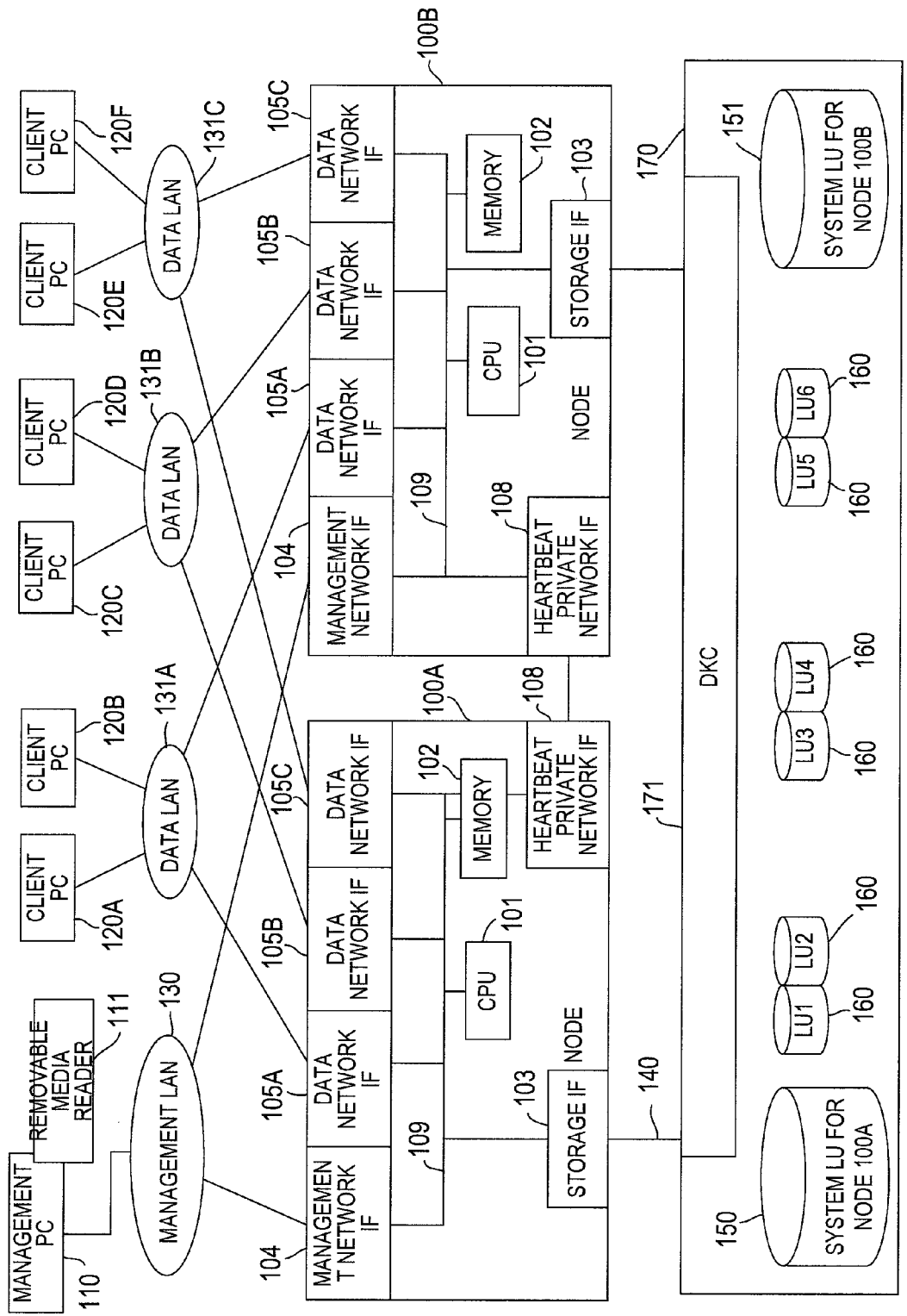
FIG. 1 is a block diagram of a configuration of a computer system according to the embodiment of this invention.

FIG. 1 is a block diagram of a configuration of a computer system according to the embodiment of this invention.

The computer system includes a management computer (management PC) 110, client computers (client PCs) 120A to 120F (hereinafter, sometimes referred to simply as client PCs 120), a management local area network (LAN) 130, data LANs 131A to 131C (hereinafter, sometimes referred to simply as data LANs 131), a storage network 140, nodes 100A and 100B (hereinafter, sometimes referred to simply as nodes 100), and a storage system 170.

The management LAN 130 connects the management PC 110 to the node 100. The data LAN 131 connects the client PC 120 to the node 100. The storage network 140 connects the node 100 to the storage system 170. SCSI or Fibre Channel is applied to the storage network 140, for example.

The management PC 110 includes a CPU, a memory, an interface, and a removable media reader 111. The management PC 110 manages the node 100 via the management LAN 130. Details of the management PC 110 will be described later with reference to FIG. 6.

The removable media reader 111 reads data from removable media for software installation. The removable media reader 111 is a drive for reading a CD-ROM, a DVD-ROM, or a flash memory, for example. Thus, the management PC 110 can access the removable media for software installation. Details of the removable media for software installation will be described later with reference to FIG. 4. The management PC 110 may not include the removable media reader 111 and may be connected to the removable media reader 111.

The client PC 120 includes a CPU, a memory, and an interface. The client PC 120 is provided with a service from the node 100. In FIG. 1, the six client PCs 120A to 120F are shown. However, the computer system may include any number of client PCs 120.

The node 100 constitutes a cluster and provides the client PC 120 with a service. The node 100 includes a CPU 101, a memory 102, a storage interface 103, a management network interface 104, data network interfaces 105A to 105C (hereinafter, sometimes referred to simply as data network interfaces 105), a heartbeat private network interface 108, and a bus 109.

The bus 109 connects the CPU 101, the memory 102, the storage interface 103, the management network interface 104, the data network interface 105, and the heartbeat private network interface 108 to each other.

The CPU 101 performs various processes by executing programs stored in the memory 102. For example, the CPU 101 inputs/outputs data to/from the storage system 170.

The memory 102 stores the programs executed by the CPU 101, information required by the CPU 101, and the like.

The storage interface 103 is connected to the storage system 170 via the storage network 140. The storage interface 103 is a SCSI interface or a Fibre Channel interface, for example. The management network interface 104 is connected to the management PC 110 via the management LAN 130.

The data network interface 105 is connected to the client PC 120 via the data LAN 131. It should be noted that the node 100 includes the three data network interfaces 105A to 105C in FIG. 1, but may include any number of data network interfaces 105.

In FIG. 1, the node 100 includes the three data network interfaces 105A to 105C. The data network interface 105A is connected to the client PCs 120A and 120B via the data LAN 131A. The data network interface 105B is connected to the client PCs 120C and 120D via the data LAN 131B. The data network interface 105C is connected to the client PCs 120E and 120F via the data LAN 131C.

In the different data LANs 131A to 131C, communications do not interfere with each other.

In this embodiment, the data LANs 131A to 131C are three physically different networks. However, the data LANs 131A to 131C may be obtained by logically dividing one physical network by a firewall.

For example, the data LANs 131A to 131C are logically configured by connecting LAN at the client PC 120 side to LAN at the node 100 side via a firewall. The data LANs 131A to 131C are also logically configured by connecting LAN at the client PC 120 side and LAN at the node 100 side to the Internet via different firewalls, respectively. Alternatively, the data LANs 131A to 131C are logically configured by connecting LAN at the client PC 120 side and LAN at the node 100 side to the Internet via a common firewall having multiple ports.

The heartbeat private network interface 108 connects the nodes 100A and 100B to each other.

For example, a series of IEEE 802 standards, Asynchronous Transfer Mode (ATM), or the like is applied to the management network interface 104, the data network interface 105, or the heartbeat private network interface 108.

Alternatively, the IEEE 802.3ad standard may be applied to the management network interface 104, the data network interface 105, or the heartbeat private network interface 108. In this case, those multiple physical network interfaces are regarded as one connection, so the fault tolerance is increased and the load is balanced.

Further, the node 100 uses a logical division function provided for a kernel (not shown) to configure virtual servers (VNASs) in the node 100. Accordingly, the node 100 provides the client PC 120 and the like with multiple independent VNASs.

The storage system 170 includes a disk controller (DKC) 171 and a disk drive. The DKC 171 controls input/output of data to/from the disk drive. The DKC 171 provides the node 100 with a storage area of the disk drive as one or more logical volumes (LUs) 150, 151, and 160. The DKC 171 may provide the node 100 with the disk drive instead of the LUs.

The system LU 150 for the node 100A stores system software and the like of the node 100A, and is accessed by the node 100A. The system LU 150 for the node 100A further stores the version of the system software of the node 100A.

The system LU 151 for the node 100B stores system software and the like of the node 100B, and is accessed by the node 100B. The LUs 160 store various types of information, and are accessed by both the VNAS of the node 100A and the VNAS of the node 100B. The system LU 151 for the node 100B further stores the version of the system software of the node 100B.

FIG. 2 is a configuration diagram of a VNAS configuration table 200 stored in the system LU 150 for the node 100A and system LU 151 for the node 100B according to the embodiment of this invention.

The VNAS configuration table 200 includes a VNAS name 201, a network device 202, a block device 203, a root filesystem 204, and a system software version 205.

The VNAS name 201 indicates the unique identifier of a VNAS operated in the node 100. In this embodiment, a VNAS1, a VNAS2, and a VNAS3 are operated in the node 100.

The network device 202 indicates the unique identifier of a data network interface 105 allocated to the VNAS identified by the VNAS name 201 of the same column. It should be noted that the VNAS exclusively uses the data network interface 105 allocated thereto.

In this embodiment, the data network interface 105A is allocated to the VNAS1. The data network interface 105B is allocated to the VNAS2. The data network interface 105C is allocated to the VNAS3.

The block device 203 indicates the unique identifier of an LU 160 allocated to the VNAS identified by the VNAS name 201 of the same column. It should be noted that the VNAS exclusively uses the LU 160 allocated thereto.

In this embodiment, an LU1 (160) and an LU2 (160) are allocated to the VNAS1. An LU3 (160) and an LU4 (160) are allocated to the VNAS2. An LU5 (160) and an LU6 (160) are allocated to the VNAS3.

The root filesystem 204 indicates the unique identifier of the LU 160 that includes a root filesystem, among the LUs 160 identified by the block device 203 of the same column. In this embodiment, the LU1 (160), the LU3 (160), and the LU5 (160) each include the root filesystem.

The system software version 205 indicates the version of the system software of the root filesystem included in the LU 160 identified by the root filesystem 204 of the same column. In this embodiment, the version of the system software of the root filesystem included in each of the LU1 (160), the LU3 (160), and the LU5 (160) is a version of 1.0.

Figure 6:
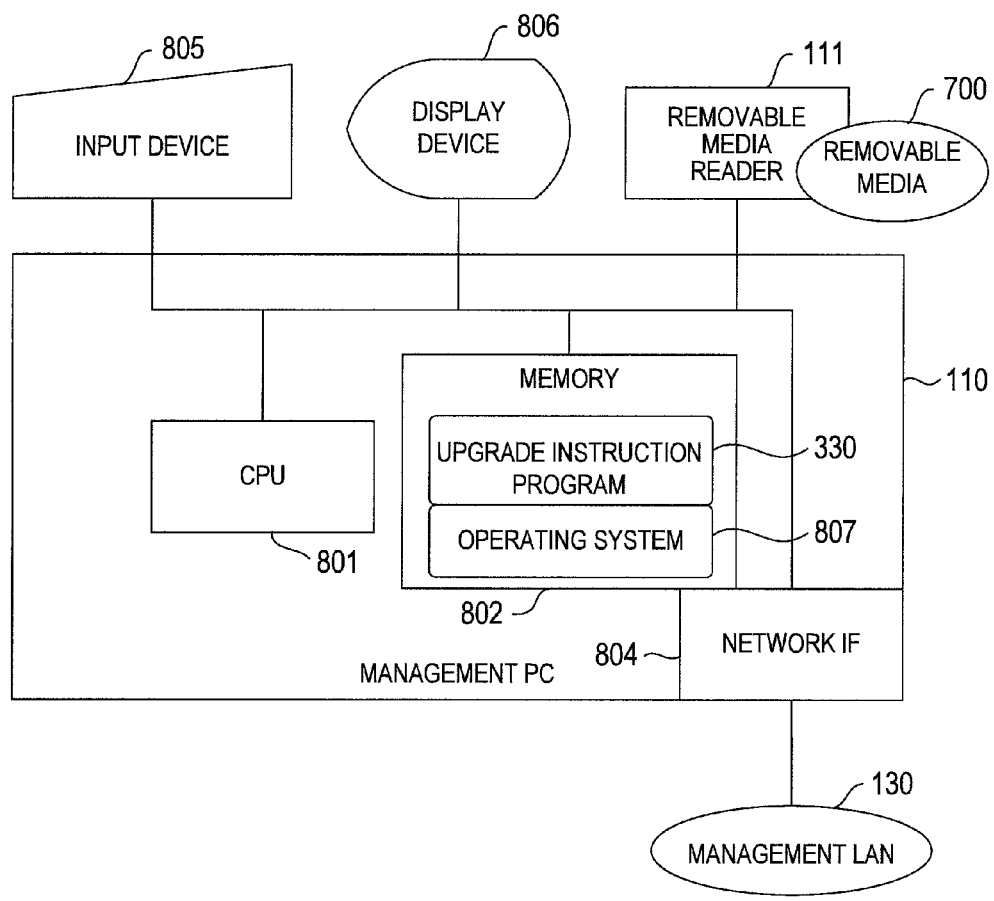
FIG. 6 is a block diagram of a hardware configuration of the management PC of the embodiment of this invention.

FIG. 6 is a block diagram of a hardware configuration of the management PC 110 of the embodiment of this invention.

The management PC 110 includes a CPU 801, a memory 802, a network interface 804, an input device 805, a display device 806, and the removable media reader 111.

The memory 802 stores programs executed by the CPU 801, information required by the CPU 801, and the like. For example, the memory 802 stores an upgrade instruction program 330 and an operating system 807. The operating system 807 controls the entire processing of the management PC 110.

The CPU 801 performs various processes by executing the programs stored in the memory 802. For example, the CPU 801 calls the upgrade instruction program 330 and the operating system 807 from the memory 802 and executes the upgrade instruction program 330 and the operating system 807. Further, the CPU 801 controls the network interface 804, the input device 805, the display device 806, and the removable media reader 111.

The network interface 804 is connected to the nodes 100A and 100B via the management LAN 130.

Information is inputted to the input device 805 by, for example, an operator who performs upgrading. The input device 805 accepts an instruction to execute the upgrade instruction program 330 or an instruction to progress the upgrade instruction program 330, for example.

The display device 806 displays various types of information. For example, the display device 806 displays a progress status of the upgrade instruction program 330.

The removable media reader 111 reads data from removable media for software installation 700. The removable media reader 111 transfers the read data to the memory 802 or the network interface 804.

Figure 3:
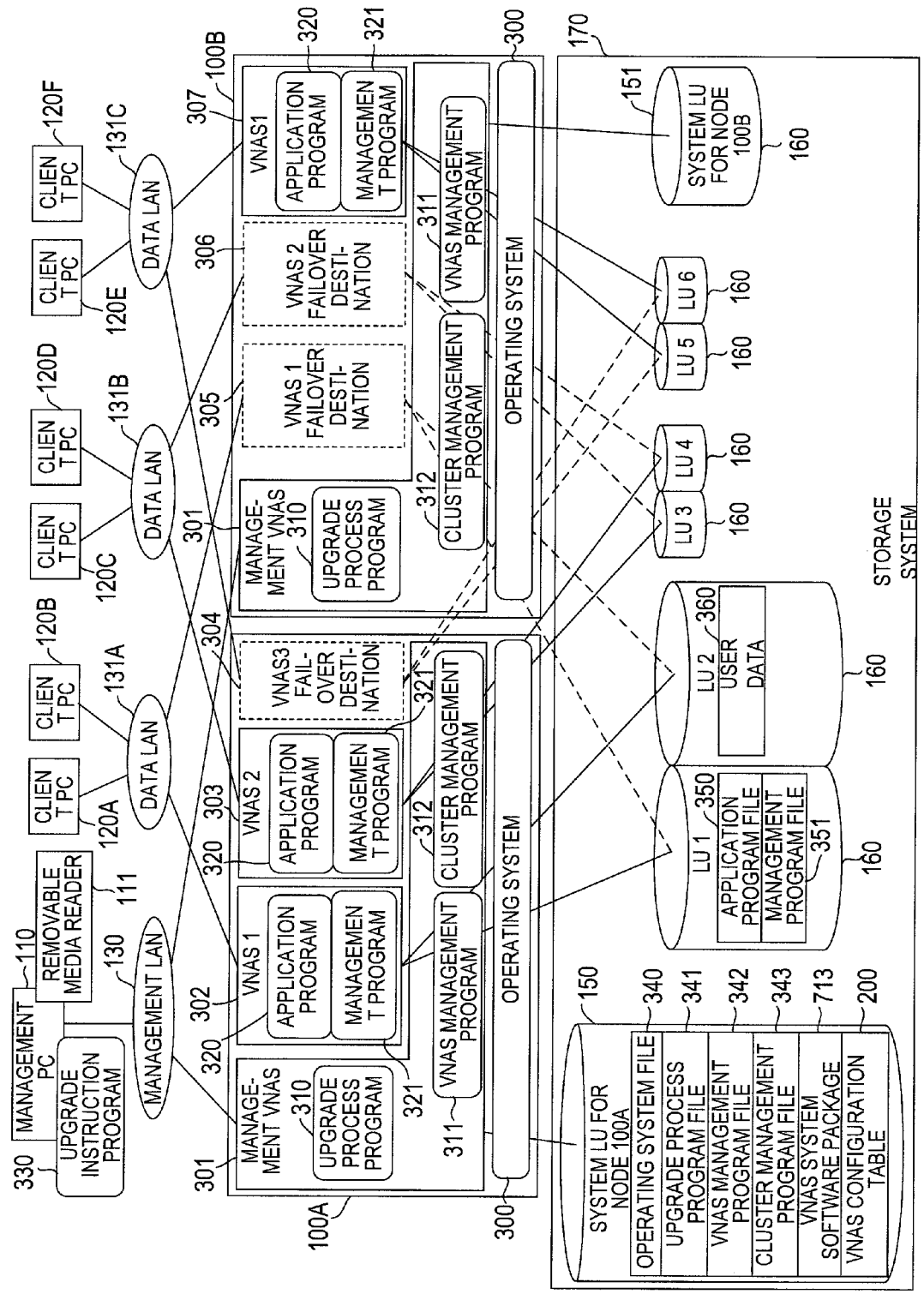
FIG. 3 is a block diagram of a function configuration of the computer system according to the embodiment of this invention.

FIG. 3 is a block diagram of a function configuration of the computer system according to the embodiment of this invention.

The memory (not shown) of the management PC 110 stores the upgrade instruction program 330. The upgrade instruction program 330 upgrades the system software in cooperation with an upgrade process program 310 of the node 100.

The memory (not shown) of each client PC 120 stores a client program. The client program generates, refers to, or updates user data 360 by communicating with an application program 320 of the VNAS.

The CPU 101 of the node 100 executes an operating system 300. The operating system 300 controls the entire processing of the node 100.

A management VNAS 301 is operated in the node 100. The management VNAS 301 manages resources of the node 100. Specifically, the management VNAS 301 allocates the resources of the node 100 to the VNAS1 (302), the VNAS2 (303), or the VNAS3 (307). With this operation, the management VNAS 301 generates environments for the VNAS1 (302), the VNAS2 (303), and the VNAS3 (307).

The management VNAS 301 executes the upgrade process program 310, a VNAS management program 311, and a cluster management program 312.

In other words, the memory 102 allocated to the management VNAS 301 stores the upgrade process program 310, the VNAS management program 311, and the cluster management program 312.

The CPU 101 allocated to the management VNAS 301 calls the upgrade process program 310, the VNAS management program 311, and the cluster management program 312 from the memory 102, and executes the upgrade process program 310, the VNAS management program 311, and the cluster management program 312.

The upgrade process program 310 upgrades the system software in cooperation with the upgrade instruction program 330.

The VNAS management program 311 boots or shuts down the VNAS1 (302), the VNAS2 (303), or the VNAS3 (307).

The cluster management program 312 monitors the status of a node 100 (external node 100) connected to the node 100 that executes the cluster management program 312. Upon detection of a failure of the external node 100, the cluster management program 312 fails over the VNAS operated in the external node 100. In addition, upon reception of a failover instruction, the cluster management program 312 fails over the VNAS specified by the failover instruction.

In FIG. 3, the VNAS1 (302) and the VNAS2 (303) are operated in the node 100A. The VNAS3 (307) is operated in the node 100B. In this case, the node 100A includes a VNAS3 failover destination 304. The node 100B includes a VNAS1 failover destination 305 and a VNAS2 failover destination 306.

Each of the VNAS1 (302), the VNAS2 (303), and the VNAS3 (307) uses the resource of the node 100, allocated by the management VNAS 301 to provide the client PC 120 with a service. The VNAS1 (302), the VNAS2 (303), and the VNAS3 (307) execute the application program 320 and a management program 321.

In other words, the memory 102 allocated to any one of the VNAS1 (302), the VNAS2 (303), and the VNAS3 (307) stores the application program 320 and the management program 321.

The CPU 101 allocated to any one of the VNAS1 (302), the VNAS2 (303), and the VNAS3 (307) calls the application program 320 and the management program 321 from the memory 102, and executes the application program 320 and the management program 321.

The application program 320 provides the client PC 120 with a service. For example, the application program 320 serves as a web server, a file server, a DB server, or an authentication server.

The management program 321 prepares an execution environment for the application program 320 when a VNAS is booted or shut down.

The VNAS1 failover destination 305 indicates that a resource required for operating the VNAS1 (302) has been secured. Thus, the same configuration is obtained even when the VNAS1 (302) is operated in either one of the nodes 100A and 100B. The VNAS1 (302) can be moved smoothly between the nodes 100A and 100B.

Each of the nodes 100A and 100B can access the LU 160 that includes the root filesystem. Accordingly, the VNAS1 (302) can execute the same application program 320 even when the VNAS1 (302) is operated in either one of the nodes 100A and 100B.

Similarly, the VNAS2 failover destination 306 indicates that a resource required for operating the VNAS2 (303) has been secured. The VNAS3 failover destination 304 indicates that a resource required for operating the VNAS3 (307) has been secured.

The storage system 170 provides the system LU 150 for the node 100A, the system LU 151 for the node 100B, and the LU1 to LU6 (160).

The system LU 150 for the node 100A is accessed by the management VNAS 301 operated in the node 100A. The system LU 151 for the node 100B is accessed by the management VNAS 301 operated in the node 100B.

Each of the system LU 150 for the node 100A and the system LU 151 for the node 100B stores an operating system file 340, an upgrade process program file 341, a VNAS management program file 342, a cluster management program file 343, a VNAS system software package 713, and the VNAS configuration table 200.

The operating system file 340 includes the operating system 300 executed by the CPU 101 included in the node 100. The upgrade process program file 341 includes the upgrade process program 310 executed by the management VNAS 301 included in the node 100.

The VNAS management program file 342 includes the VNAS management program 311 executed by the management VNAS 301 included in the node 100. The cluster management program file 343 includes the cluster management program 312 executed by the management VNAS 301 included in the node 100.

The VNAS system software package 713 is a software package applied to the root filesystems of the VNAS1 (302), the VNAS2 (303), and the VNAS3 (307). Specifically, the VNAS system software package 713 includes an update image of an application program file 350, an update image of a management program file 351, and the like.

The VNAS configuration table 200 of FIG. 2 shows the configuration of the VNAS1 (302), the VNAS2 (303), and the VNAS3 (307).

The LU1 (160) and the LU2 (160) are accessed by the VNAS1 (302) operated in the node 100A or the node 100B. The LU3 (160) and the LU4 (160) are accessed by the VNAS2 (303) operated in the node 100A or the node 100B. The LU5 (160) and the LU6 (160) are accessed by the VNAS3 (307) operated in the node 100A or the node 100B.

The LU1 (160), the LU3 (160), and the LU5 (160) each include the root filesystem. The root filesystem includes the application program file 350 and the management program file 351.

The application program file 350 includes the application program 320 executed by the VNAS1 (302), the VNAS2 (303), or the VNAS3 (307) included in the node 100. The management program file 351 includes the management program 321 executed by the VNAS1 (302), the VNAS2 (303), or the VNAS3 (307) included in the node 100.

The LU2 (160), the LU4 (160), and the LU6 (160) each include the user data 360. Specifically, the VNAS1 (302) stores the user data 360 in the LU2 (160). The VNAS2 (303) stores the user data 360 in the LU4 (160). The VNAS3 (307) stores the user data 360 in the LU6 (160).

As described above, the VNAS1 (302), the VNAS2 (303), and the VNAS3 (307) provide services to different client PCs 120. The two nodes 100A and 100B operate the VNAS1 (302), the VNAS2 (303), and the VNAS3 (307) in a distributed manner. Accordingly, in this computer system, since the load is balanced, performance can be improved. Even when a failure occurs in either one of the nodes 100A and 100B, the other one of the nodes 100A and 100B, in which a failure has not occurred, operates the VNAS1 (302), the VNAS2 (303), and the VNAS3 (307). Therefore, even when a failure occurs in either one of the nodes 100A and 100B, this computer system can continue to provide a service.

It should be noted that even in a computer system with high performance and high reliability, there is a case where a software failure is found, a function is changed, or a new function is added. In this case, it is necessary to change (upgrade) the system software. Hereinafter, upgrading software in this computer system will be described.

Figure 4:
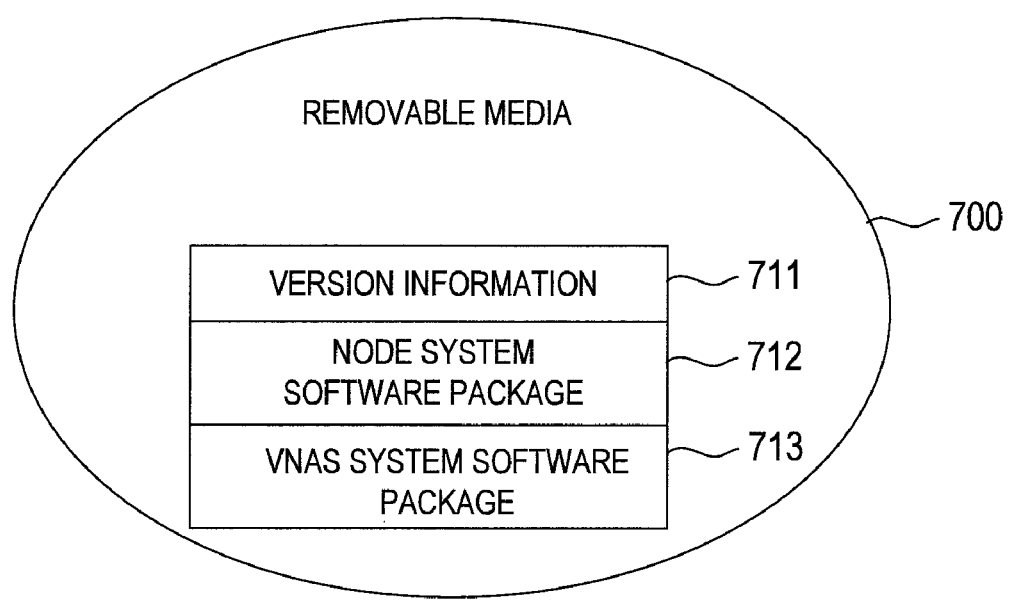
FIG. 4 is an explanatory diagram of the removable media for software installation of the embodiment of this invention.
Figure 5A:
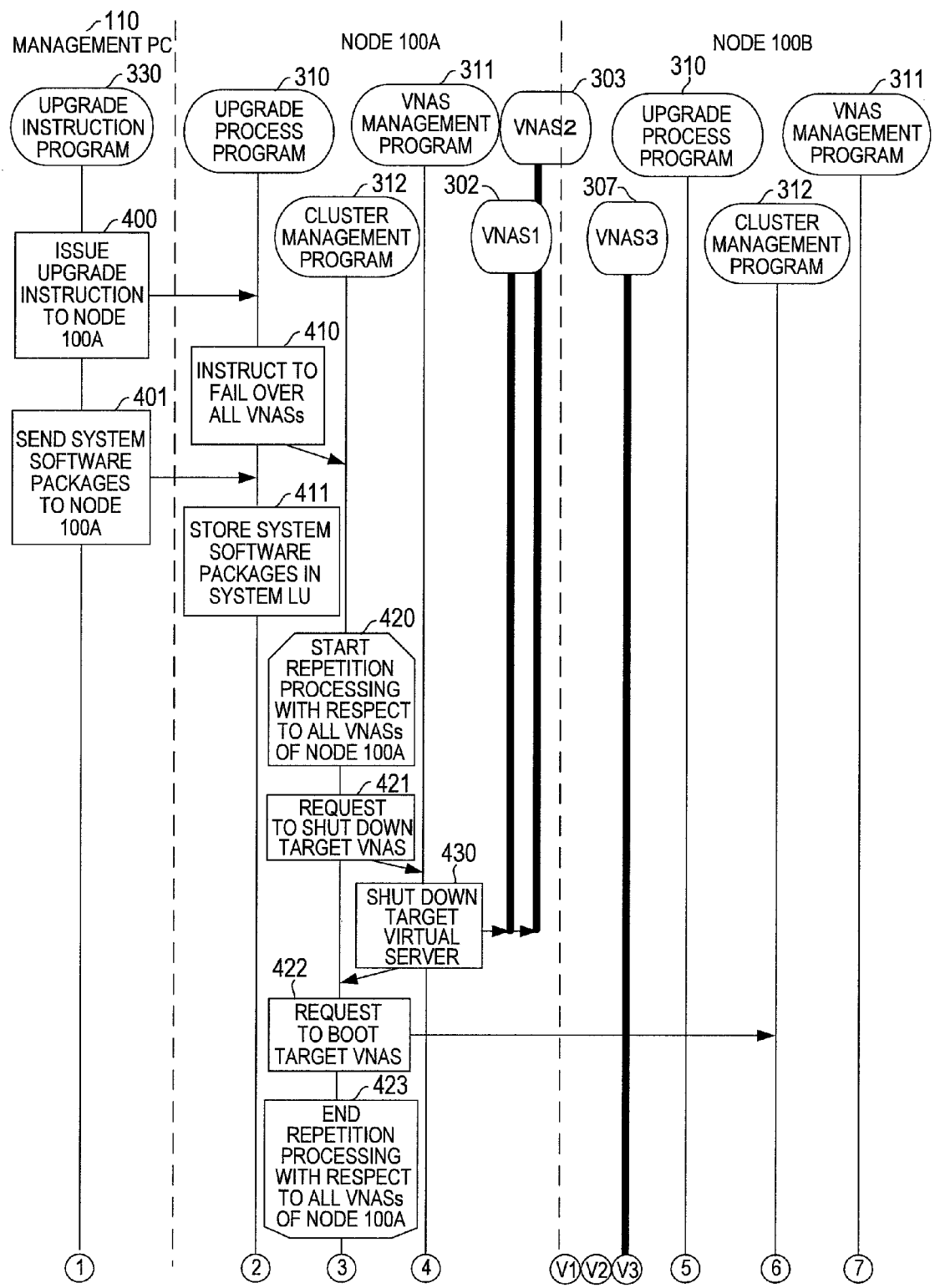
FIG. 5A is sequence diagram of a system software upgrade process performed in the computer system according to the embodiment of this invention.
Figure 5B:
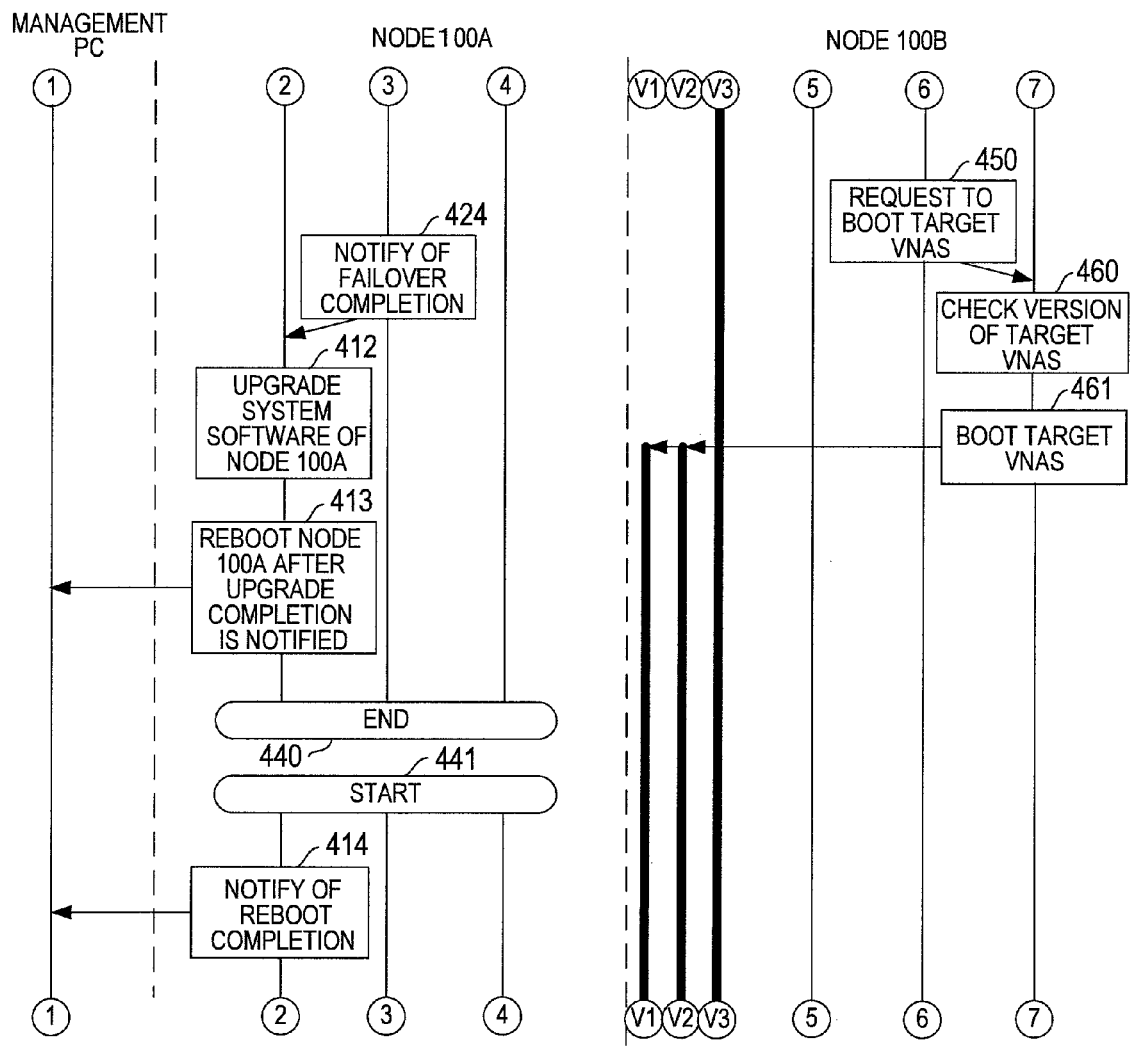
FIG. 5B is sequence diagram of a system software upgrade process performed in the computer system according to the embodiment of this invention.
Figure 5C:
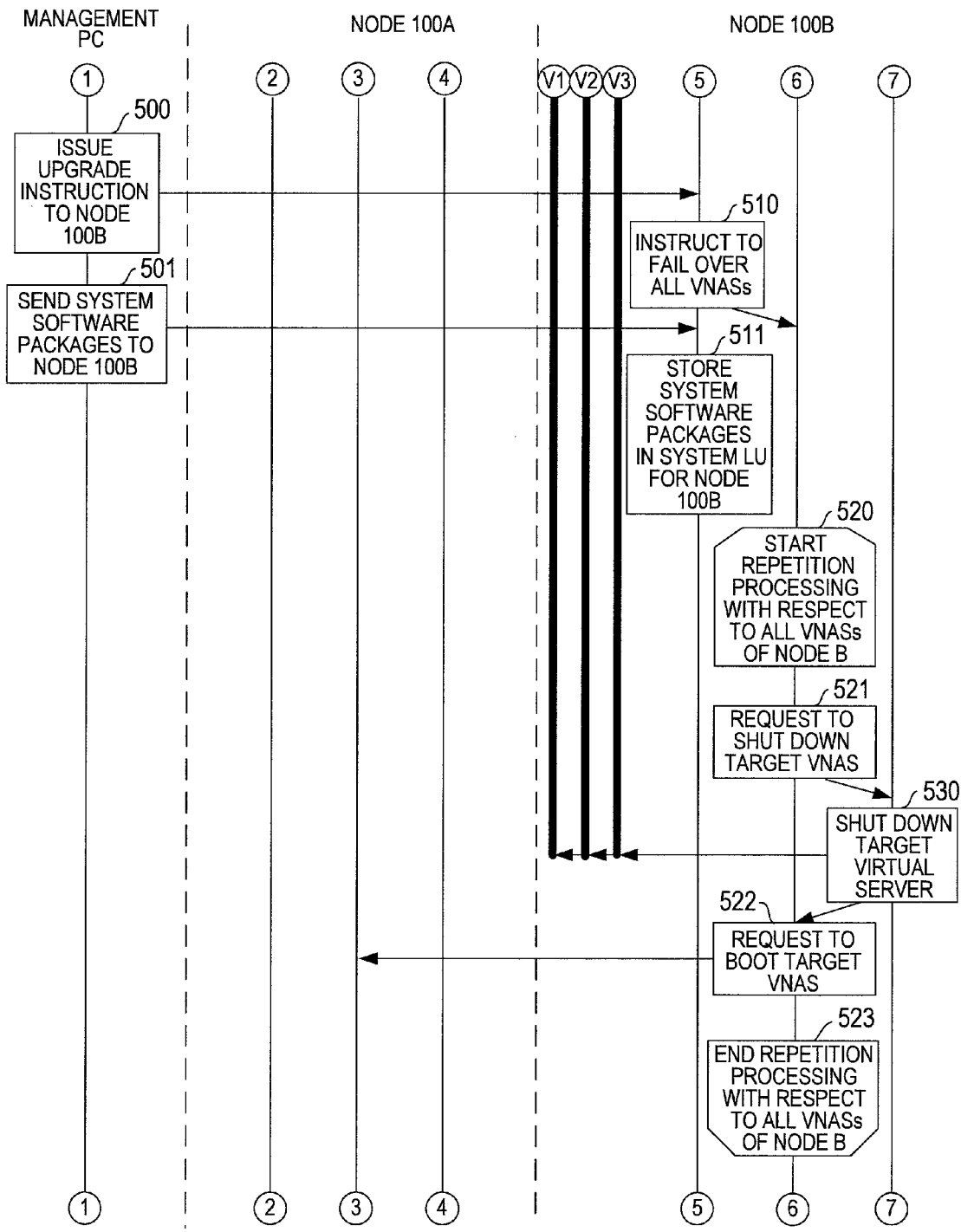
FIG. 5C is sequence diagram of a system software upgrade process performed in the computer system according to the embodiment of this invention.
Figure 5D:
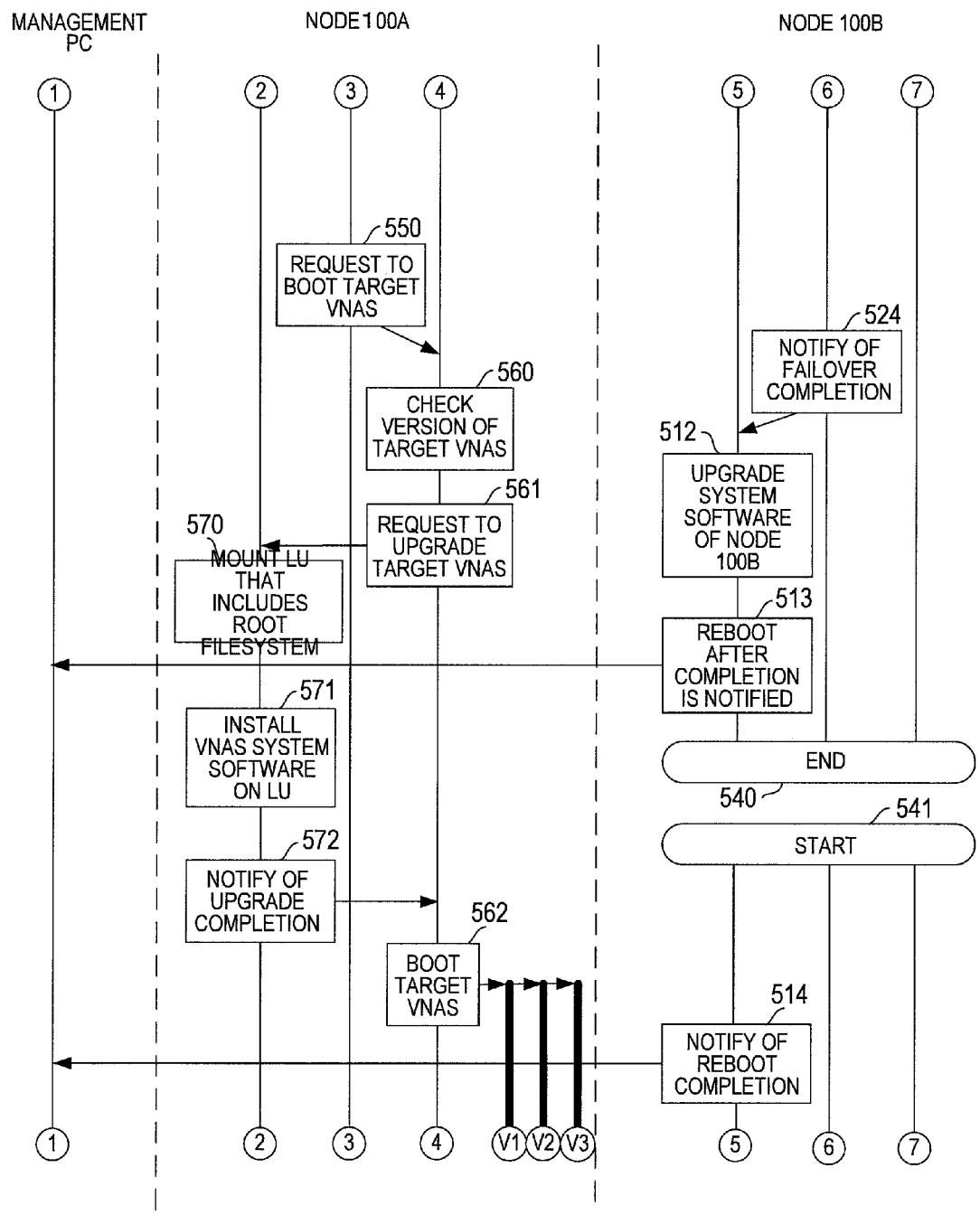
FIG. 5D is sequence diagram of a system software upgrade process performed in the computer system according to the embodiment of this invention.
Figure 5E:
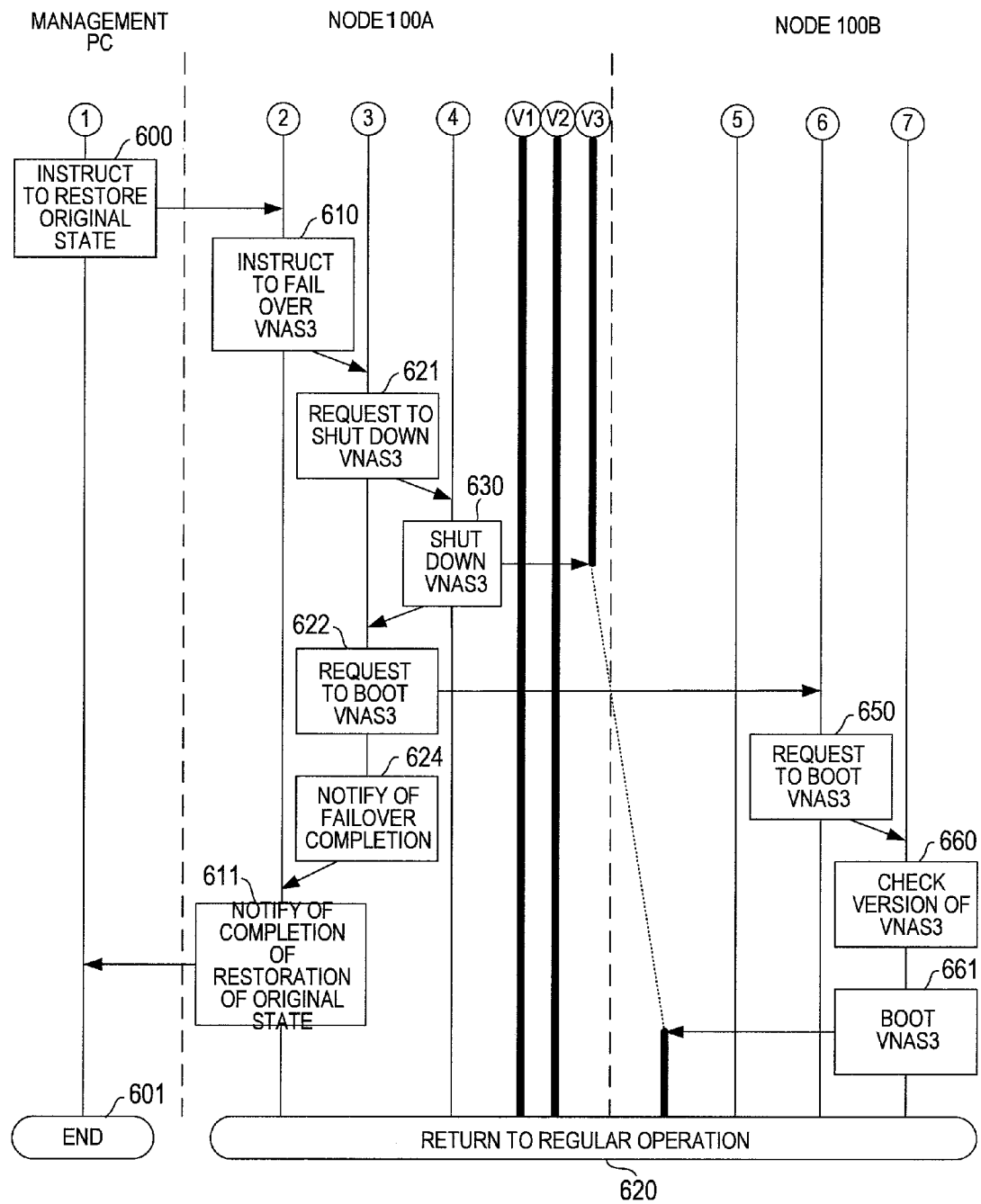
FIG. 5E is sequence diagram of a system software upgrade process performed in the computer system according to the embodiment of this invention.

FIG. 4 is an explanatory diagram of the removable media for software installation 700 of the embodiment of this invention.

The removable media for software installation 700 stores version information 711, a node system software package 712, and the VNAS system software package 713.

The version information 711 indicates the versions of the node system software package 712 and the VNAS system software package 713.

The node system software package 712 is applied to the system LU 150 for the node 100A and the system LU 151 for the node 100B. For example, the node system software package 712 includes an update image of at least one of the operating system file 340, the upgrade process program file 341, the VNAS management program file 342, and the cluster management program file 343.

The VNAS system software package 713 is applied to the LU1 (160), the LU3 (160), and the LU5 (160) each including the root filesystem. For example, the VNAS system software package 713 includes an update image of at least one of the application program file 350 and the management program file 351.

FIGS. 5A to 5E are sequence diagrams of a system software upgrade process performed in the computer system according to the embodiment of this invention.

In the removable media reader 111 included in the management PC 110, the removable media for software installation 700 which includes new versions of the system software packages are set in advance.

First, the upgrade instruction program 330 of the management PC 110 issues an upgrade instruction to the upgrade process program 310 of the node 100A (400).

The upgrade process program 310 of the node 100A receives the upgrade instruction. The upgrade process program 310 of the node 100A then instructs the cluster management program 312 of the node 100A to fail over all VNASs operated in the node 100A to the node 100B (410).

It should be noted that it takes time until the upgrade process program 310 of the node 100A receives a notification of failover completion from the cluster management program 312 of the node 100A. Then, the upgrade instruction program 330 of the management PC 110 reads out the node system software package 712 and the VNAS system software package 713 from the removable media for software installation 700. Next, the upgrade instruction program 330 of the management PC 110 sends the read node system software package 712 and VNAS system software package 713 to the upgrade process program 310 of the node 100A (401).

The upgrade process program 310 of the node 100A receives the node system software package 712 and the VNAS system software package 713. Next, the upgrade process program 310 of the node 100A stores the received node system software package 712 and VNAS system software package 713 in the system LU 150 for the node 100A (411).

Meanwhile, the cluster management program 312 of the node 100A receives the failover instruction from the upgrade process program 310 of the node 100A. The cluster management program 312 of the node 100A executes repetition processing (steps 420 to 423) with respect to all VNASs operated in the node 100A. In this embodiment, the cluster management program 312 of the node 100A executes the repetition processing with respect to the VNAS1 (302) and the VNAS2 (303).

First, the cluster management program 312 of the node 100A sequentially selects the VNASs operated in the node 100A (420). Next, the cluster management program 312 of the node 100A requests the VNAS management program 311 of the node 100A to shut down the selected VNAS (421).

Upon reception of the VNAS shutdown request, the VNAS management program 311 of the node 100A shuts down the operation of the VNAS requested to be shut down (430). Then, the VNAS management program 311 of the node 100A notifies the cluster management program 312 of the node 100A of the VNAS shutdown completion.

The cluster management program 312 of the node 100A receives the notification of the VNAS shutdown completion from the VNAS management program 311 of the node 100A. Then, the cluster management program 312 of the node 100A selects a column whose VNAS name 201 matches the identifier of the VNAS selected in the step 420 from the VNAS configuration table 200 stored in the system LU 150 for the node 100A.

Next, the cluster management program 312 of the node 100A extracts the system software version 205 from the selected column. The cluster management program 312 of the node 100A sends a request to boot the VNAS selected in the step 420 to the cluster management program 312 of the node 100B (422). The request to boot the VNAS includes the extracted system software version 205.

The cluster management program 312 of the node 100A executes the repetition processing until all the VNASs operated in the node 100A are selected in the step 420. When all the VNASs operated in the node 100A are selected in the step 420, the cluster management program 312 of the node 100A ends the repetition processing (423). In this embodiment, the operations of the VNAS1 (302) and the VNAS2 (303) are shut down through the repetition processing.

Thereafter, the cluster management program 312 of the node 100A notifies the upgrade process program 310 of the node 100A of the failover completion (424).

Meanwhile, the cluster management program 312 of the node 100B receives the request to boot the VNAS from the cluster management program 312 of the node 100A. The cluster management program 312 of the node 100B then requests the VNAS management program 311 of the node 100B to boot the VNAS specified in the request to boot the VNAS (450). At this time, the cluster management program 312 of the node 100B notifies the VNAS management program 311 of the node 100B of the system software version included in the received request to boot the VNAS.

Upon reception of the request to boot the VNAS, the VNAS management program 311 of the node 100B obtains the system software version of the node 100B from the system LU 151 for the node 100B. Next, the VNAS management program 311 of the node 100B judges whether the notified system software version matches the obtained system software version of the node 100B (460). In this case, the notified system software version matches the obtained system software version of the node 100B.

When the two versions match, it is unnecessary to upgrade the system software of the VNAS requested to be booted. Accordingly, the VNAS management program 311 of the node 100B boots the VNAS requested to be booted (461). The VNAS management program 311 of the node 100B selects a column whose VNAS name 201 matches the identifier of the booted VNAS from the VNAS configuration table 200 stored in the system LU 151 for the node 100B. The VNAS management program 311 of the node 100B stores the notified system software version in the system software version 205 of the selected column.

In this embodiment, the VNAS management program 311 of the node 100B boots the VNAS1 (302) and the VNAS2 (303).

Meanwhile, after the upgrade process program 310 of the node 100A stores the received node system software package 712 and VNAS system software package 713 in the system LU 150 for the node 100A and receives the notification of the failover completion, the upgrade process program 310 of the node 100A advances to a step 412.

The upgrade process program 310 of the node 100A applies the node system software package 712 to the system LU 150 for the node 100A. With this operation, the upgrade process program 310 of the node 100A upgrades the system software of the node 100A (412).

Upon completion of the upgrade, the upgrade process program 310 of the node 100A notifies the upgrade instruction program 330 of the management PC 110 of the upgrade completion.

Then, the upgrade process program 310 of the node 100A reboots the node 100A in order to execute the upgraded system software (413). In other words, all the programs of the node 100A are ended once (440) and then started again (441).

The upgrade process program 310 of the node 100A notifies the upgrade instruction program 330 of the management PC 110 of reboot completion (414).

Consequently, the system software of the node 100A is updated to a new version. In the node 100A, no VNAS is operated. On the other hand, the system software of the node 100B is still the old version. In the node 100B, all the VNASs are operated.

The upgrade instruction program 330 of the management PC 110 receives the notification of the reboot completion from the upgrade process program 310 of the node 100A. The upgrade instruction program 330 of the management PC 110 issues an upgrade instruction to the upgrade process program 310 of the node 100B (500).

The upgrade process program 310 of the node 100B receives the upgrade instruction. The upgrade process program 310 of the node 100B then instructs the cluster management program 312 of the node 100B to fail over all VNASs operated in the node 100B to the node 100A (510).

It should be noted that it takes time until the upgrade process program 310 of the node 100B receives a notification of failover completion from the cluster management program 312 of the node 100B. Then, the upgrade instruction program 330 of the management PC 110 reads out the node system software package 712 and the VNAS system software package 713 from the removable media for software installation 700. Next, the upgrade instruction program 330 of the management PC 110 sends the read node system software package 712 and VNAS system software package 713 to the upgrade process program 310 of the node 100B (501).

The upgrade process program 310 of the node 100B receives the node system software package 712 and the VNAS system software package 713. Next, the upgrade process program 310 of the node 100B stores the received node system software package 712 and VNAS system software package 713 in the system LU 151 for the node 100B (511).

Meanwhile, the cluster management program 312 of the node 100B receives the failover instruction from the upgrade process program 310 of the node 100B. The cluster management program 312 of the node 100B executes repetition processing (steps 520 to 523) with respect to all VNASs operated in the node 100B. In this embodiment, the cluster management program 312 of the node 100B executes the repetition processing with respect to the VNAS1 (302), the VNAS2 (303), and the VNAS3 (307).

First, the cluster management program 312 of the node 100B sequentially selects the VNASs operated in the node 100B (520). Next, the cluster management program 312 of the node 100B requests the VNAS management program 311 of the node 100B to shut down the selected VNAS (521).

Upon reception of the VNAS shutdown request, the VNAS management program 311 of the node 100B shuts down the operation of the VNAS requested to be shut down (530). Then, the VNAS management program 311 of the node 100B notifies the cluster management program 312 of the node 100B of the VNAS shutdown completion.

The cluster management program 312 of the node 100B receives the notification of the VNAS shutdown completion from the VNAS management program 311 of the node 100B. Then, the cluster management program 312 of the node 100B selects a column whose VNAS name 201 matches the identifier of the VNAS selected in the step 520 from the VNAS configuration table 200 stored in the system LU 151 for the node 100B.

Next, the cluster management program 312 of the node 100B extracts the system software version 205 from the selected column. The cluster management program 312 of the node 100B sends a request to boot the VNAS selected in the step 520 to the cluster management program 312 of the node 100A (522). The request to boot the VNAS includes the extracted system software version 205.

The cluster management program 312 of the node 100B executes the repetition processing until all the VNASs operated in the node 100B are selected in the step 520. When all the VNASs operated in the node 100B are selected in the step 520, the cluster management program 312 of the node 100B ends the repetition processing (523). In this embodiment, the operations of the VNAS1 (302), the VNAS2 (303), and the VNAS3 (307) are shut down through the repetition processing.

Thereafter, the cluster management program 312 of the node 100B notifies the upgrade process program 310 of the node 100B of the failover completion (524).

Meanwhile, the cluster management program 312 of the node 100A receives the request to boot the VNAS from the cluster management program 312 of the node 100B. The cluster management program 312 of the node 100A then requests the VNAS management program 311 of the node 100A to boot the VNAS specified in the request to boot the VNAS (550). At this time, the cluster management program 312 of the node 100A notifies the VNAS management program 311 of the node 100A of the system software version included in the received request to boot the VNAS.

Upon reception of the request to boot the VNAS, the VNAS management program 311 of the node 100A obtains the system software version of the node 100A from the system LU 150 for the node 100A. Next, the VNAS management program 311 of the node 100A judges whether the notified system software version matches the obtained system software version of the node 100A (560). In this case, the notified system software version does not match the obtained system software version of the node 100A.

When the two versions do not match, it is necessary to upgrade the system software of the VNAS requested to be booted. Accordingly, the VNAS management program 311 of the node 100A requests the upgrade process program 310 of the node 100A to upgrade the system software of the VNAS requested to be booted (561).

Upon reception of the upgrade request, the upgrade process program 310 of the node 100A mounts the LU 160 that includes the root filesystem of the VNAS that is a target of the upgrade, to the node 100A (570).

Next, the upgrade process program 310 of the node 100A applies the VNAS system software package 713 stored in the system LU 150 for the node 100A to the mounted LU 160 (571). With this operation, the upgrade process program 310 of the node 100A upgrades the system software of the VNAS.

Next, the upgrade process program 310 of the node 100A unmounts the LU 160 to which the VNAS system software package 713 is applied.

The upgrade process program 310 of the node 100A notifies the VNAS management program 311 of the node 100A of the upgrade completion (572).

The VNAS management program 311 of the node 100A receives the notification of the upgrade completion from the upgrade process program 310 of the node 100A. The VNAS management program 311 of the node 100A boots the VNAS requested to be booted (562). Further, the VNAS management program 311 of the node 100A selects a column whose VNAS name 201 matches the identifier of the booted VNAS from the VNAS configuration table 200 stored in the system LU 150 for the node 100A. Next, the VNAS management program 311 of the node 100A stores the notified system software version in the system software version 205 of the selected column.

In this embodiment, the upgrade process program 310 of the node 100A upgrades the system software of the VNAS1 (302), the VNAS2 (303), and the VNAS3 (307). Further, the VNAS management program 311 of the node 100A boots the VNAS1 (302), the VNAS2 (303), and the VNAS3 (307).

Meanwhile, after the upgrade process program 310 of the node 100B stores the received node system software package 712 and VNAS system software package 713 in the system LU 151 for the node 100B and receives the notification of the failover completion, the upgrade process program 310 of the node 100B advances to a step 512.

The upgrade process program 310 of the node 100B applies the node system software package 712 to the system LU 151 for the node 100B. With this operation, the upgrade process program 310 of the node 100B upgrades the system software of the node 100B (512).

Upon completion of the upgrade, the upgrade process program 310 of the node 100B notifies the upgrade instruction program 330 of the management PC 110 of the upgrade completion.

Then, the upgrade process program 310 of the node 100B reboots the node 100B in order to execute the upgraded system software (513). In other words, all the programs of the node 100B are ended once (540) and then started again (541).

The upgrade process program 310 of the node 100B notifies the upgrade instruction program 330 of the management PC 110 of reboot completion (514).

Meanwhile, the upgrade instruction program 330 of the management PC 110 receives the notification of the reboot completion from the upgrade process program 310 of the node 100B. The upgrade instruction program 330 of the management PC 110 instructs the upgrade process program 310 of the node 100A to restore the original state (600).

Upon reception of the instruction to restore the original state, the upgrade process program 310 of the node 100A instructs the cluster management program 312 of the node 100A to fail over the VNAS that has been operated in the node 100B at first (prior to the step 400) to the node 100B.

In this embodiment, the upgrade process program 310 of the node 100A instructs the cluster management program 312 of the node 100A to fail over the VNAS3 (307) (610).

The cluster management program 312 of the node 100A receives the failover instruction from the upgrade process program 310 of the node 100A. The cluster management program 312 of the node 100A then requests the VNAS management program 311 of the node 100A to shut down the VNAS3 (307) (621).

Upon reception of the request to shut down the VNAS3 (307), the VNAS management program 311 of the node 100A shuts down the operation of the VNAS3 (307) (630). The VNAS management program 311 of the node 100A notifies the cluster management program 312 of the node 100A of the completion of shutdown of the VNAS3 (307).

The cluster management program 312 of the node 100A receives the completion notification of shutdown of the VNAS3 (307) from the VNAS management program 311 of the node 100A. Then, the cluster management program 312 of the node 100A selects a column whose VNAS name 201 matches the identifier of the VNAS3 (307) from the VNAS configuration table 200 stored in the system LU 150 for the node 100A.

Next, the cluster management program 312 of the node 100A extracts the system software version 205 from the selected column. The cluster management program 312 of the node 100A sends a request to boot the VNAS3 (307) to the cluster management program 312 of the node 100B (622). The request to boot the VNAS3 (307) includes the extracted system software version 205.

Next, the cluster management program 312 of the node 100A notifies the upgrade process program 310 of the node 100A of the failover completion (624).

Meanwhile, the cluster management program 312 of the node 100B receives the request to boot the VNAS3 (307) from the cluster management program 312 of the node 100A. The cluster management program 312 of the node 100B then requests the VNAS management program 311 of the node 100B to boot the VNAS3 (307) (650). At this time, the cluster management program 312 of the node 100B notifies the VNAS management program 311 of the node 100B of the system software version included in the received request to boot the VNAS3 (307).

The VNAS management program 311 of the node 100B obtains the system software version of the node 100B from the system LU 151 for the node 100B. Next, upon reception of the request to boot the VNAS3 (307), the VNAS management program 311 of the node 100B judges whether the notified system software version matches the obtained system software version of the node 100B (660). In this case, the notified system software version matches the obtained system software version of the node 100B.

When the two versions match, it is unnecessary to upgrade the system software of the VNAS3 (307). Accordingly, the VNAS management program 311 of the node 100B boots the VNAS3 (307) (661). The VNAS management program 311 of the node 100B selects a column whose VNAS name 201 matches the identifier of the VNAS3 (307) from the VNAS configuration table 200 stored in the system LU 151 for the node 100B. The VNAS management program 311 of the node 100B stores the notified system software version in the system software version 205 of the selected column.

Meanwhile, the upgrade process program 310 of the node 100A receives the notification of the failover completion from the cluster management program 312 of the node 100A. The upgrade process program 310 of the node 100A notifies the upgrade instruction program 330 of the management PC 110 of the completion of the restoration of the original state (611).

When the upgrade instruction program 330 of the management PC 110 receives the notification of the completion of the restoration of the original state, the system software upgrade process ends (601).

The upgrade process program 310, the VNAS management program 311, and the cluster management program 312 are executed by the CPU 101 included in the node 100A or the node 100B. The upgrade instruction program 330 is executed by the CPU 801 included in the management PC 110.

As described above, when a VNAS to which an old version of the system software is applied is booted, the node 100 to which a new version of the system software is applied automatically upgrades the system software applied to the VNAS. Thus, a problem that the new version of the system software and the old version of the system software exist at the same time can be solved. A service provided by the VNAS is shut down only during the period required for failover and the period required for applying the VNAS system software package 713 to the LU 160. Thus, the downtime of the service provided by the VNAS is reduced compared with the conventional techniques.

In the conventional techniques, every time the system software of the VNAS is upgraded, the VNAS system software package 713 is transferred from the management PC 110 to the node 100. On the other hand, in this embodiment, when the node 100 is upgraded, the VNAS system software package 713 is stored in the system LU 150 for the node 100A or the system LU 151 for the node 100B. Accordingly, it is unnecessary to transfer the VNAS system software package 713 from the management PC 110 to the node 100 when the system software of the VNAS is upgraded. Therefore, in this embodiment, the downtime of the service provided by the VNAS is reduced compared with the conventional techniques.

In addition, in this embodiment, since the management VNAS 301 updates the system software of the VNAS, the VNAS does not need to have an upgrade function.

Further, it is unnecessary to connect the management PC 110 to the data LAN 131 through which an access can be made to the VNAS to upgrade the system software of the VNAS. Therefore, the data of clients for whom services are provided by the VNAS can be prevented from being viewed or changed by the operator who performs the upgrading.

It should be noted that the VNAS1 (302), the VNAS2 (303), and the VNAS3 (307) may execute the identical application program 320 or may execute different application programs 320, respectively. Similarly, the VNAS1 (302), the VNAS2 (303), and the VNAS3 (307) may execute the identical management program 321 or may execute different management programs 321, respectively.

A description will be given of a case where the VNAS1 (302), the VNAS2 (303), and the VNAS3 (307) execute different application programs 320, respectively, or different management programs 321, respectively. In this case, the removable media for software installation 700 stores the VNAS system software package 713 for each VNAS. The node 100A applies the proper VNAS system software package 713 to the mounted LU 160 in the step 571.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a first cluster node providing a first virtual management server and a first virtual server, the first virtual management server managing the first cluster node;
   a second cluster node providing a second virtual management server and a second virtual server, the second virtual management server managing the second cluster node;
   a management computer; and
   a storage system coupled to the first cluster node and the second cluster node, the storage system comprising:
   a first system logical volume;
   a second system logical volume;
   a first logical volume; and
   a second logical volume,
   wherein the first system logical volume and the second system logical volume each store first system software executed by the first virtual management server and the second virtual management server, respectively,
   wherein the first logical volume and the second logical volume each store second system software executed by the first virtual server and the second virtual server respectively, the second system software being compatible with the first system software,
   wherein the first virtual management server, in response to receipt of a version upgrade request from a management computer, for the first system software executed by the first virtual management server, stores in the first system logical volume a new version of the first system software and a new version of the second system software, which is compatible with the new version of the first system software, the new version of the first system software and the new version of the second system software being received from the management computer, stops the first virtual server, sends to the second virtual management server a request to start the second virtual server, and upgrades the first system software to the new version of the first system software stored in the first system logical volume,
   wherein the management computer, in response to receipt of the completion of an upgrade of the first system software on the first virtual management server, sends to the second virtual management server a version upgrade request for the first system software executed by the second virtual management server,
   wherein the second virtual management server, in response to receipt of the version upgrade request, stores in the second system logical volume the new version of the first system software and the new version of the second system software, which is compatible with the new version of the first system software, the new version of the first system software and the new version of the second system software being received from the management computer, stops the second virtual server, sends to the first virtual management server a request to start the first virtual server, and upgrades the first system software to the new version of the first system software stored in the second system logical volume, and
   wherein the first virtual management server, in response to receipt of the request from the second virtual management server, upgrades the second system software to the new version of the second system software stored in the first system logical volume, and starts the first virtual server.

2. The computer system according to claim 1, wherein the request to start the second virtual server includes version information regarding the second system software that the first virtual server executes, and
   wherein the second virtual management server, in response to receipt of the request to start the second virtual server, checks the version information associated with the request, and starts the second virtual server when, as a result of the checking the version information associated with the request, an upgrade of the second system software that the second virtual server executes is deemed unnecessary.

3. The computer system according to claim 1, wherein the request to start the first virtual server includes version information regarding the second system software that the second virtual server executes, and
   wherein the first virtual management server, in response to receipt of the request to start the first virtual server, checks the version information associated with the request, and upgrades the second system software when, as a result of checking the version information associated with the request, an upgrade of the second system software that the first virtual server executes is deemed necessary.

4. The computer system according to claim 1, wherein the first virtual management server mounts the first logical volume and performs the upgrade of the second system software.

5. A system software update method for a computer system, the computer system comprising a first cluster node providing a first virtual management server and a first virtual server, the first virtual management server managing the first cluster node; a second cluster node providing a second virtual management server and a second virtual server, the second virtual management server managing the second cluster node; a management computer; and a storage system coupled to the first cluster node and the second cluster node, the storage system comprising a first system logical volume; a second system logical volume; a first logical volume; and a second logical volume, the method comprising:

storing in each of the first system logical volume and the second system logical volume first system software executed by the first virtual management server and the second virtual management server, respectively;

storing in each of the first logical volume and the second logical volume second system software executed by the first virtual server and the second virtual server respectively, the second system software being compatible with the first system software;

wherein the first virtual management server, in response to receipt of a version upgrade request from a management computer, for the first system software executed by the first virtual management server, performs steps of:

storing in the first system logical volume a new version of the first system software and a new version of the second system software, which is compatible with the new version of the first system software, the new version of the first system software and the new version of the second system software being received from the management computer;

stopping the first virtual server;

sending to the second virtual management server a request to start the second virtual server; and upgrading the first system software to the new version of the first system software stored in the first system logical volume, wherein the management computer, in response to receipt of the completion of an upgrade of the first system software on the first virtual management server, sends to the second virtual management server a version upgrade request for the first system software executed by the second virtual management server, wherein the second virtual management server, in response to receipt of the version upgrade request, performs steps of:

storing in the second system logical volume the new version of the first system software and the new version of the second system software, which is compatible with the new version of the first system software, the new version of the first system software and the new version of the second system software being received from the management computer;

stopping the second virtual server;

sending to the first virtual management server a request to start the first virtual server; and upgrading the first system software to the new version of the first system software stored in the second system logical volume, and wherein the first virtual management server, in response to receipt of the request from the second virtual management server, upgrades the second system software to the new version of the second system software stored in the first system logical volume, and starts the first virtual server.

6. The system software update method according to claim 5, wherein the request to start the second virtual server includes version information regarding the second system software that the first virtual server executes, and wherein the second virtual management server, in response to receipt of the request to start the second virtual server, checks the version information associated with the request, and starts the second virtual server when, as a result of the checking the version information associated with the request, an upgrade of the second system software that the second virtual server executes is deemed unnecessary.

7. The system software update method according to claim 5, wherein the request to start the first virtual server includes version information regarding the second system software that the second virtual server executes, and wherein the first virtual management server, in response to receipt of the request to start the first virtual server, checks the version information associated with the request, and upgrades the second system software when, as a result of checking the version information associated with the request, an upgrade of the second system software that the first virtual server executes is deemed necessary.

8. The system software update method according to claim 5, further comprising:

mounting, by the first virtual management server, the first logical volume; and performing, by the first virtual management server, the upgrade of the second system software.

* * * * *